(12) United States Patent
Nerone (10) Patent No.: US 8,274,232 B2
(45) Date of Patent: Sep. 25, 2012

(54) LIGHTING SYSTEM COMMUNICATIONS APPARATUS AND METHOD

(75) Inventor: Louis Robert Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 12/849,400

(22) Filed: Aug. 3, 2010

(65) Prior Publication Data
US 2012/0032608 A1 Feb. 9, 2012

(51) Int. Cl.
H05B 37/02 (2006.01)
(52) U.S. Cl. .............. 315/209 R; 315/216; 315/224; 315/226; 315/295
(58) Field of Classification Search ............. 315/209 R, 315/210–211, 215–216, 224, 226, 246, 250, 315/291, 294–295
See application file for complete search history.

(56) References Cited

U.S. PATENT DOCUMENTS

| | | | |
|---|---|---|---|
| 4,408,185 A | 10/1983 | Rasmussen | |
| 5,897,194 A * | 4/1999 | Ham | 362/20 |
| 5,962,989 A | 10/1999 | Baker | |
| 7,493,100 B2 | 2/2009 | Welles, II et al. | |
| 7,548,223 B2 | 6/2009 | Brooksby et al. | |
| 2003/0127997 A1 | 7/2003 | Shoji et al. | |
| 2005/0169643 A1* | 8/2005 | Franklin | 398/187 |
| 2009/0009093 A1* | 1/2009 | Vernondier et al. | 315/158 |

FOREIGN PATENT DOCUMENTS

| | | |
|---|---|---|
| DE | 10 2009 011 208 A1 | 11/2009 |
| DE | 102009011208 A1 | 11/2009 |
| EP | 0038877 A1 | 11/1981 |
| GB | 2335334 A | 9/1999 |

OTHER PUBLICATIONS

PCT Invitation to pay additional fees issued in connection with corresponding WO Patent Application No. US11/39398 filed on Jun. 7, 2011.
PCT Search Report and Written Opinion dated Feb. 28, 2012 from corresponding Application No. PCT/US2011/039398.
PCT International Search Report, International Application PCT/US2011/039398, Feb. 28, 2012.

\* cited by examiner

*Primary Examiner* — Jason M Crawford
(74) *Attorney, Agent, or Firm* — Fay Sharpe LLP (57) ABSTRACT

A communications apparatus and techniques are presented for communicating with ballasts or drivers through lighting system power connections in which the power connections are energized with low levels of power to power communications components in the ballast/drivers while the light sources are off and low frequency AC communications signals are transmitted through the power connections.

24 Claims, 4 Drawing Sheets

LIGHTING SYSTEM COMMUNICATIONS APPARATUS AND METHOD

BACKGROUND OF THE DISCLOSURE

The disclosure relates to lighting systems and more particularly to communications apparatus and techniques for communicating with ballasts or drivers through power connections in a lighting system. Remote lighting control is desirable, and in particular, control of electronic ballasts and/or LED drivers via the power line connections allows improved functionality without additional control wiring. Power line communications (PLC) circuits have been in existence for many years, in which a modulated carrier signal is transmitted through the power wiring to which a lighting system ballast is connected. These existing circuits, however, often require filter trapping to confine the signal to the targeted ballasts or controllable devices, and the ballast must have a receiver to interpret signals that are superimposed on the power line. Accordingly, conventional power line communications systems are inflexible and expensive. Triac modulation of the power line voltage by modulation of the phase angle has also been discussed but this can have severe compatibility issues with ballasts that are incapable of absorbing pulsed current from the triac. Thus, there remains a need for improved communications systems to mitigate or avoid these problems of power line communications filters and triac incompatibility.

SUMMARY OF THE DISCLOSURE

The present disclosure provides an apparatus for communicating with a ballast or driver through power connections in a lighting system. The apparatus includes a first terminal coupled with an AC power source, a second terminal coupled with a first power connection top which one or more lighting ballasts or drivers are connected, as well as a third terminal coupled with a second output of the AC power source. A first switching device is coupled between the first and second terminals and operates according to a first switching control signal to selectively couple the first terminal to the second terminal in a first state and to decouple the first and second terminals from one another in a second state. The apparatus also includes a communications system having a secondary power output operatively coupled with the second terminal, a secondary power circuit that converts power from the first and third terminals to selectively provide secondary power to the secondary power output, and a transceiver circuit to selectively provide a communication signal to the secondary power output. A dual mode control circuit provides the switching control signal in a first mode to provide power from the AC power source through the first switching device to the ballast or driver. In a second mode, the control circuit places the first switching device in the second state and causes the communications system to provide the secondary power and the communication signal through the second terminal to the ballast or driver. In this manner, data is transmitted to the electronic ballast or controllable driver when the power to the ballasts or drivers is off using existing power lines and without requiring extensive filter circuitry and without risk of ballast damage previously associated with triac modulation communication techniques.

In certain embodiments, the communications system provides secondary power and communication signals to the ballast or driver at a level below a threshold of the lighting ballast or driver. This facilitates communications without activation of main power circuitry in the ballast or driver.

In certain embodiments, a second switching device is provided between the secondary power output and the second terminal. The second switch is operated via a second switching control signal from the control circuit to selectively decouple the secondary power output from the second terminal in a first state and to couple the secondary power output to the second terminal in a second state. The control circuit in these embodiments operates to place the first and second switching devices in their respective first states to provide power from the AC power source through the first switching device to the ballasts or drivers and in the second mode to provide secondary power and communications signals through the second terminal to the ballasts or drivers.

Two-way communications is provided in certain embodiments, with the transceiver circuit being operative to receive communication signals from the lighting ballast or driver through the second terminal.

The transceiver may employ a variety of communication mechanisms in conjunction with the application of secondary power to the power lines. In certain embodiments, the secondary power provides a DC signal and the transceiver circuit provides the communication signal as a pulse signal on the DC signal. In certain embodiments, the communications uses low frequency signaling, where the transceiver circuit provides the pulse signal at a frequency less than 500 Hz. In other embodiments, the DC voltage is zero and a sine wave or other low amplitude AC signal is provided to the lighting ballast or driver via the second terminal, using any suitable modulation methods such as FSK, FM, AM, etc. In certain implementations, the transceiver circuit provides the communication signal as a frequency shift keyed (FSK) signal, for example, using frequencies less than 500 Hz. In other implementations, the transceiver provides the communication signal as a low frequency (e.g., less than 500 Hz) amplitude modulated (AM) signal.

The apparatus in certain embodiments has a communications interface coupled with the control circuit to provide wired or wireless communications between the control circuit and an external device. In certain embodiments, moreover, a fourth terminal is operatively coupled with a control input of the control circuit, allowing sensing of a user switch to control application or removal of main lighting power.

A method is provided for communicating with a ballast or driver through power connections in a lighting system. The method includes selectively coupling an AC power source through a plurality of lighting system power connections to at least one lighting ballast or driver for powering at least one light source in a first mode, and in a second mode, selectively decoupling the AC power source from one or more of the power connections and providing secondary power and a communication signal through the power connection(s) to the ballast or driver. In certain embodiments, the communication signal is provided as an FSK signal. In certain embodiments, the communication signal is provided as an AM signal. In certain embodiments, the secondary power is provided as a DC signal and the communication signal is provided as a pulse signal on the DC signal. In certain embodiments, the secondary power and the communication signal are provided at a level below a light output turn on threshold of the ballast or driver.

A lighting system ballast or driver apparatus is provided, which includes a main power conversion system operatively coupled with a plurality of lighting system power connections. The main power conversion system includes one or more power conversion components to selectively convert power received from the power connections to provide power to a light source if the power received from the lighting system power connections is above a light output turn on threshold value and to otherwise refrain from providing power to the light source. The main power conversion system also includes a ballast or driver controller operative to control operation of the power conversion component (s). The ballast or driver apparatus further includes a communications system operatively coupled with the main power conversion system and with one or more of the lighting system power connections.

The communications system includes a communications power system that converts power from the lighting system power connection or from the main power conversion system to provide communications power at a communications power output. The communications system also includes a communication controller and a transceiver powered from the communications power output. The transceiver circuit receives communications signaling directly or indirectly from the lighting system power connection and provides a data output based at least in partial on the communications signal. The communication controller receives the data output and communicates with the ballast or driver controller. In this manner, the apparatus can communicate with another device through the power line connections while the main lighting power is off, for example, to receive programming information, dimming level setpoints, control profiles, and/or to provide status, diagnostic, and/or fault data to another device connected to the power lines.

In certain embodiments, the transceiver circuit transmits communication signals directly or indirectly to the lighting system power connections for two-way communications. In certain embodiments, the apparatus is a ballast and the main power conversion system includes an inverter providing AC power to one or more lamps if the power received from the lighting system power connections is above the light output turn on threshold value. In other embodiments, the apparatus is a lighting system driver and the main power conversion system includes a DC to DC converter providing DC power to one or more LED arrays if the received power is above the threshold.

BRIEF DESCRIPTION OF THE DRAWINGS

One or more exemplary embodiments are set forth in the following detailed description and the drawings, in which.

DETAILED DESCRIPTION OF THE PREFERRED EMBODIMENTS

Referring now to the drawings, where like reference numerals are used to refer to like elements throughout, and wherein the various features are not necessarily drawn to scale, the present disclosure relates to communications techniques and apparatus for communicating with lighting system drivers or ballasts using power lines, while avoiding or mitigating the above mentioned problems with power line communications filters and triac incompatibility.

Figure 1:
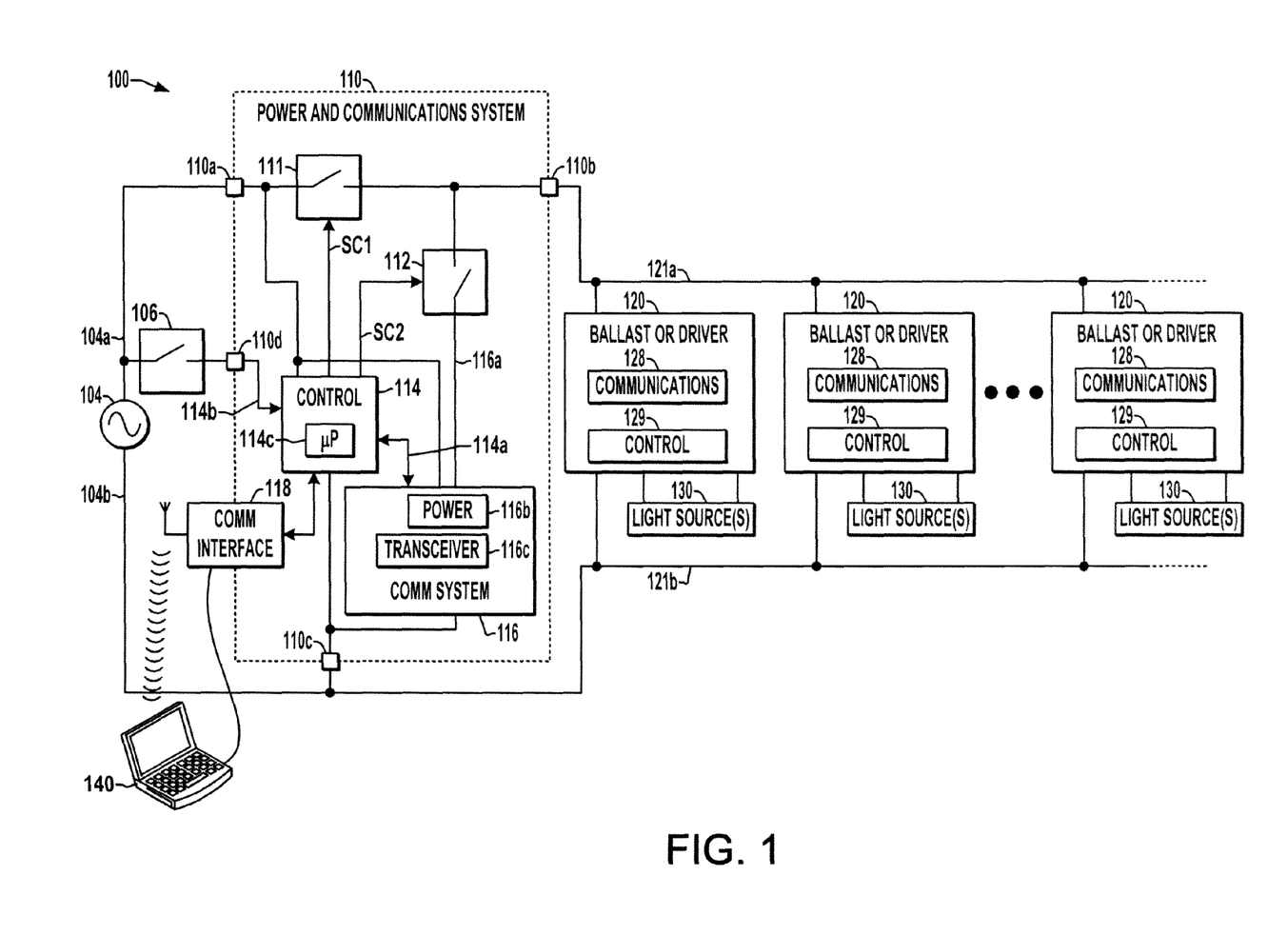
FIG. 1 is a schematic system diagram illustrating an exemplary lighting system with improved power and communications circuitry for communication with ballasts or drivers when the main lighting power is off in accordance with one or more aspects of the disclosure.
Figure 2:
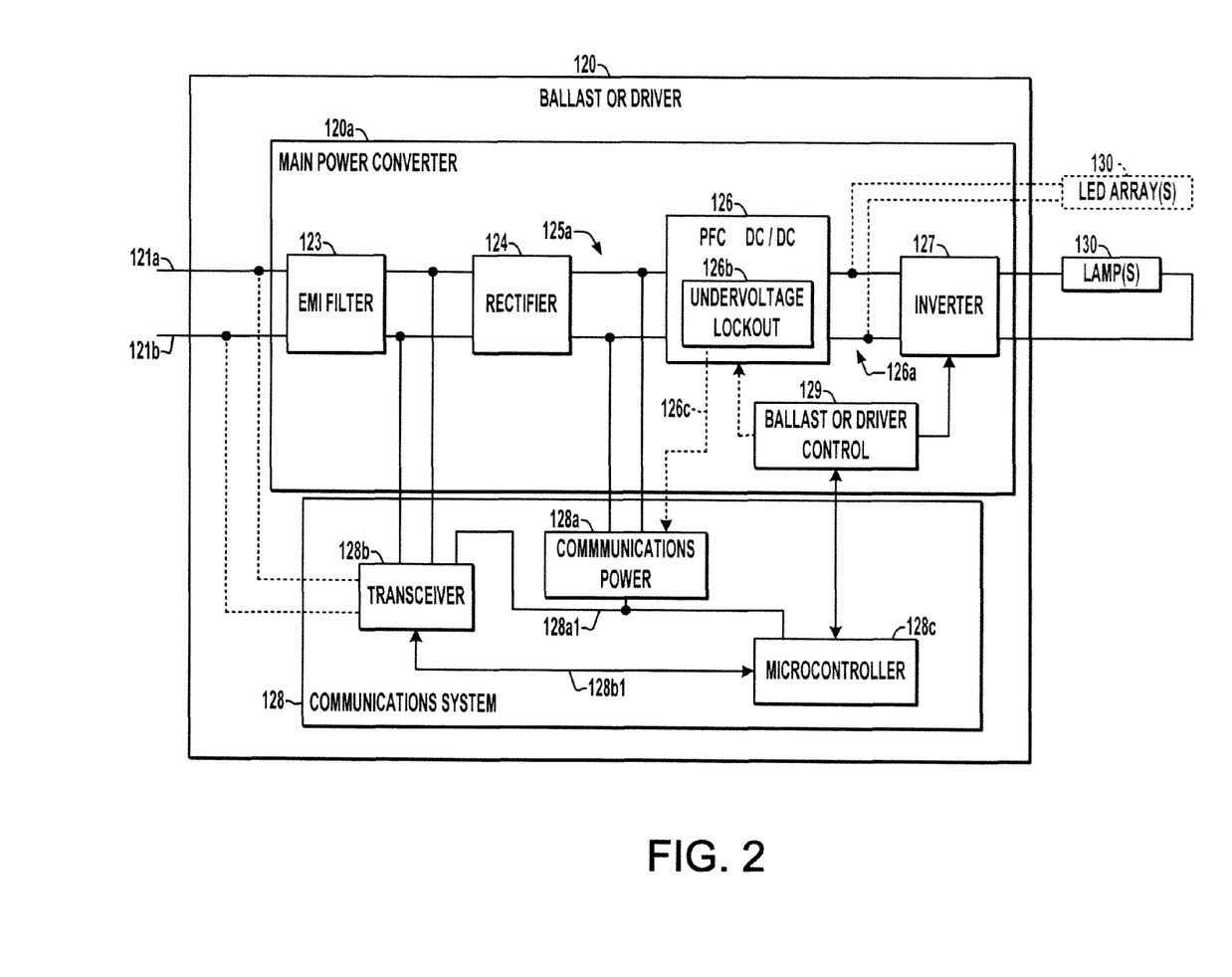
FIG. 2 is a schematic diagram illustrating an exemplary lighting ballast or driver having a main power converter and a communications system for communicating via power lines when the main power is off.

FIG. 1 illustrates a lighting system 100 equipped with a power and communications apparatus 110 and several ballasts or drivers 120 having communications and control circuits 128 and 129 in which one or more aspects of the disclosure may be carried out, and FIG. 2 shows further details of exemplary a main power conversion and communications circuitry in the ballasts/drivers 120. The apparatus 110 communicates with ballasts or drivers 120 through lighting system power connections 121 (e.g., power lines) in which load-side power connections 121a and 121b are energized with low levels of power to power the communications components 128 in the ballast/drivers 120 while the light sources 130 are off and low frequency AC communications signals 121s are transmitted through the power connections 121. In contrast to conventional power line carrier or power line communications (PLC) apparatus, the present disclosure provides for transmission of data to and/or from the electronic ballast 120 or other controllable device (e.g., LED drivers) when their lighting power is off. The power and communications apparatus 110 derives its power from the power line AC source 104, and uses one or more mechanical or electromechanical devices such as relays or even semiconductor-based switching devices 111, 112 to interrupt the supply of power from the source 104 to the load side (e.g., to the ballasts or drivers 120). In a communications mode, the apparatus 110 applies a low level DC or AC voltage to the load side to power a microcontroller 128c (FIG. 2) in the ballast/driver 120, and also provides a communications signal 121s via the power lines. In certain embodiments, when a user operates a switch or other actuator to turn the lights on, a control circuit 114 in the apparatus 110 detects the power line voltage and disconnects the low level communications power and signaling from the load side.

In operation, once this lighting power is applied to the load, the information stored in the ballast micro-controller 128c can be used in controlling the lighting output, for example, magnitude (e.g., dimming level) and the time of application for the setpoint of the controllable device (e.g., control profile). In the communications mode or certain embodiments, the power and communications signaling are of low enough amplitude and frequency to effectively provide enough power to activate the communications apparatus of the ballasts/drivers 120 while utilizing the power line connections 121a, 121b to transfer data to and from the ballasts/drivers 120 without activating or damaging the main power conversion circuitry 120a in the ballasts/drivers 120. Moreover, the use of low frequency communication s signals 121s in certain embodiments, such as near line frequency or below about 500 Hz, mitigates the adverse transfer characteristics of power transformers, thereby facilitating communications capabilities.

Figure 3:
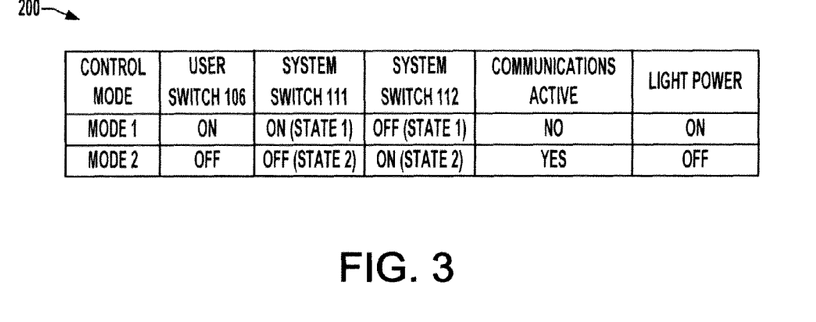
FIG. 3 is a table showing two modes of operation for the power and communications circuitry of FIG. 1 and corresponding control switch states.

Referring to FIGS. 1 and 3, the power and communications apparatus 110 in FIG. 1 is operable in first and second modes. In a first mode, power from the source 104 is provided to the ballasts/drivers 120 for normal lighting operation, in which the ballasts/drivers 120 can provide dimming operation, timed setpoint changes according to internal configurations (e.g., profile control), and other automated lighting functionality. In a second mode, the apparatus opens the switch 111 and the lighting is turned off, with the apparatus 110 providing secondary power and communications signals 121s through the power line connections 121a to the ballasts/drivers 120 for exchange of data. The exemplary apparatus 110 in FIG. 1 includes a first terminal 110a coupled with a first output 104a (e.g., line) of the AC power source 104, a second terminal 110b coupled with a first (e.g., load-side) power connection 121a which in turn is connected directly or indirectly to one or more lighting ballasts or drivers 120. A third terminal 110c of the apparatus 110 is coupled with the second AC power source output 104b (e.g., neutral). While illustrated in connection with a single phase source, other embodiments of the disclosure find utility in association with multi-phase systems as well.

The apparatus 110 includes a first switching device 111 coupled between the first and second terminals 110 and 110b. The switch 111 is operated by a control signal SC1 to selectively couple the first terminal 110a to the second terminal 110b in a first state and to decouple the first terminal 110a from the second terminal 110b in a second state. In certain implementations, the switch 111 can be a relay contact with a coil operated by the signal SC1. Other embodiments are possible using a transistor switching device 111. A communications system 116 is coupled to derive source power from the first and third terminals 110a and 110c, and the communications system 116 provides a secondary power output 116a connected directly or through a second switch 112 to the second terminal 110b. The communications system 116 includes a secondary power circuit 116b that converts power from the first and third terminals 110a and 110c in order to selectively provide secondary power to the output 116a. In addition, a transceiver circuit 116c is provided in the system 116 to selectively provide a communication signal 121s to the secondary power output 116a.

Referring to FIGS. 1 and 3, the control circuit 114 in FIG. 1 in certain embodiments includes a processor element 114c, such as a micro-controller, microprocessor, logic or other suitable hardware and/or processor-executed firmware/software and associated memory (not shown). The controller 114 operates in a first mode (MODE 1 in FIG. 3) to provide the first switching control signal SC1 so as to place the first switching device 111 in the first state (closed or ON in Table 200 of FIG. 3) to provide power from the AC power source 104 through the first switching device 111 to the ballasts/drivers 120. In a second mode, the control circuit 114 provides the first switching control signal SC1 to place the first switching device 111 in the second state (open or OFF in FIG. 3) and provides a control signal 114a to the communications system 114 to provide secondary power and the communication signal 121s through the second terminal 110b to the ballasts or drivers 120. In certain implementations, the communication system 116 will refrain from providing the secondary power and the communications signaling 121s until activated by the controller 114.

In certain embodiments, the apparatus 110 also includes a second switching device 112 coupled between the secondary power output 116a and the second terminal 110b, which is operated via a second switching control signal SC2 from the controller 114. The second switch 112 can also be a relay contact (operated by a separate coil or via the same coil that operates switch 111 with reversed logic), or switch 112 can be a semiconductor-based switch. As seen in FIGS. 1 and 3, the second switch 112 is operable according to the signal SC2 from the controller 114 to selectively decouple the secondary power output 116a from the second terminal 110b in a first state (open or OFF) and in a second (closed or ON) state to couple the secondary power output 116a to the second terminal 110b. The controller 114 provides the corresponding signals SC1 and SC2 in the first mode to provide power from the AC power source 104 through the first switching device 111 to the ballasts/drivers 120 for lighting operation, and in the second mode to provide low secondary power and communications signaling 121s to the ballasts/drivers 120.

As shown in the exemplary embodiment of FIG. 1, moreover, the apparatus 110 may include a fourth terminal 110d for providing a mode-control input 114b to the controller 114. In one implementation, a user switch 106 is connected between the line power connection 104a and the control terminal 110d such that the controller 114 can ascertain the state (open or closed) of the user switch 106, and set the operating mode accordingly. In this regard, the controller 114 sets the switch 111 to closed (and the optional second switch 112 to open) when the mode control input 114b indicates closure of the user switch 106 to provide power for lighting operation of the ballasts/drivers 120. Otherwise (if the control signal 114b indicates the user has opened the switch 106), the controller 114 opens the first switch 111 and closes the second switch 112 and activates the operation of the communications system 116 via the control signal 114a for selective communication with the ballasts/drivers 120.

The apparatus 110, moreover, can implement two-way communication with the ballasts/drivers 120, for example, with the transceiver circuit 116c in certain embodiments being operative to receive communication signals from the ballasts/driver s120 through the second terminal 110b. In this manner, the controllable devices 120 can send status information to the controller 114, including without limitation lamp burned out, ballast failed, recent lamp maintenance, or other indicators or information.

The embodiment of FIG. 1 also includes a communications interface 118 operatively coupled with the control circuit 114 to provide communications between the control circuit 114 and an external device 140, such as a computer, PDA, cell phone, or other communications device. The interface 118 may accommodate wired connections with the external device 140 and/or may provide wireless communications between the control circuit 114 and the external device 140. Using this interface 118, a user may configure the ballasts/drivers 120 by providing configuration information (e.g., setpoints, control profiles, etc.) and/or may receive status or diagnostic information related to the devices 120, with the power and communications system 110 operating as a data intermediary, with selective communication with the ballasts/drivers 120 when the main lighting power is off.

FIG. 2 illustrates further details of an exemplary ballast or driver 120 equipped with a main power conversion system 120a as well as a ballast or driver controller 129 and a communications system 128 according to the present disclosure. The main power system 120a is operatively coupled with the lighting system power connections 121a and 121b and includes one or more conversion components 123, 124, 126, 127 operative to selectively convert power received from the lighting system power connections 121 to provide output power to at least one light source 130 so long as the received power is above a light output turn on threshold value and to otherwise refrain from providing power to the light source(s) 130. The apparatus 120 in certain embodiments is a ballast, with the main power conversion system 120a having a rectifier 124 receiving AC input power through an optional EMI filter 123 and providing an initial DC output 125a to a power factor correcting (PFC) DC to DC converter 126. The converter 126, in turn, provides a DC output 178a to an inverter 127, which converts the DC 126a to provide AC output power to one or more lamps 130, such as fluorescent lamp devices. In other embodiments, the apparatus 120 is a lighting system driver and the main power conversion system 120a need not include the inverter 127. In this case, the DC to DC converter

126 provides DC output power to drive one or more LED arrays 130. In both situations, a controller 129 is provided to regulate the output power by controlling one or both of the DC to DC converter 126 and/or the inverter 127.

As further shown in FIG. 2, the ballast/driver 120 includes a communications system 128 operatively coupled with the main power conversion system 120a and with one or both of the lighting system power connections 121a and 121b. The communications system 128 includes a communications power system 128a operative to convert power from the lighting system power connections 121 or from the main power conversion system 120a to provide communications power at a communications power output 128a1. In one possible embodiment, the communications power circuit 128a derives input power from the output 125a of the rectifier 124 as shown in FIG. 2. A transceiver circuit 128b receives power from the output 128a1 and receives a communications signal 121s directly or indirectly from at least one of the lighting system power connections 121. The transceiver 128b provides data at a data output 128a1 based at least partially on the communications signal 121s, and may also provide two-communications by transmitting communications signaling 121s to at least one of the power line connections 121. A communication controller 128c is also powered by the communications power output 128a1, and may be implemented as a processing element (e.g., micro-controller, microprocessor, logic, associated memory, etc.). The communication controller 128c receives the data from the data output 128a1 of the transceiver 128b and communicates with the ballast/driver controller 129, for instance, to provide the controller 129 with received setpoints, dimming values, profiles, etc., and/or to obtain status and/or diagnostic information from the controller 129 for reporting to the apparatus 110 in FIG. 1.

Figure 4:
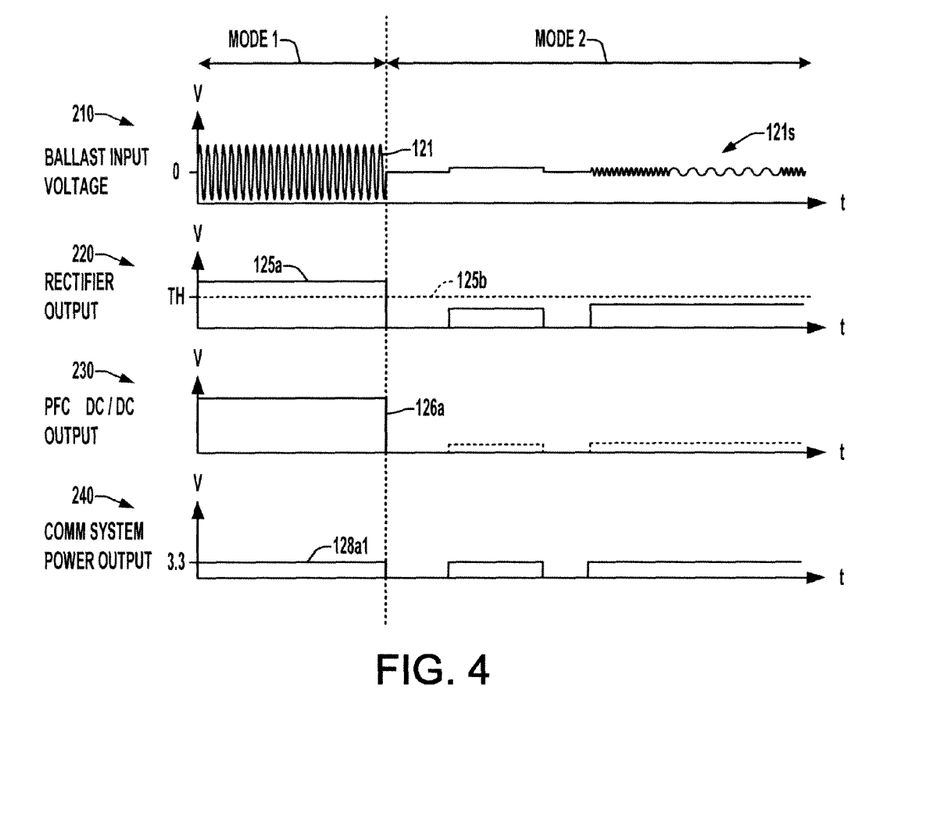
FIG. 4 provides graphs illustrating exemplary waveforms in the ballast or driver of FIG. 2.

As best shown in FIGS. 2 and 4, the turn on threshold in the illustrated embodiments is implemented by an undervoltage lockout circuit 126b in the PFC DC to DC converter 126. Other embodiments are possible in which different threshold turn on circuitry is provided by which the output power driving the light source(s) 130 is enabled only if the received power from the connections 121 exceeds a threshold value. As seen in the graph 210 of FIG. 4, the apparatus of FIG. 1 selectively provides full line power (e.g., 50 or 60 Hz 120 VAC rms) to the ballast input via the power line connections 121 in the first mode (MODE 1 in FIG. 4) and provides secondary power and communications signaling 121s in the second mode (MODE 2). The graph 220 in FIG. 4 shows the corresponding output 125a of the rectifier 124 (provided as input DC to the PFC DC to DC converter 126). This graph 220 also indicates a threshold input DC value TH 125b above which the DC to DC converter 126 begins to provide output power to either drive the LED array(s) 130 or to power the inverter 127. As shown in the graphs 220 and 230 of FIG. 4, the low secondary power provided by the power and communications apparatus 110 of FIG. 1 is set such that the rectifier output 125a is below this threshold 125b, and as a result the DC to DC converter does not provide an output in the second mode. The graph 240 in FIG. 4 illustrates the communications system power output 128a1 from the power circuit 128a in FIG. 2, which is on during the first mode and also in the second mode when communications is occurring. The DC output of the PFC circuit 126 in certain embodiments need not go exactly to zero (as shown in dashed lines in graph 230 of FIG. 4), and may remain in the second mode at about the same voltage 128a1 applied to the micro controller 128c (e.g., about 11 volts in one embodiment), which is below the threshold at which the PFC controller is activated. Thus, the PFC stage would not be activated and the DC bus of each ballast would not be enough to start up the inverters or the drivers.

Figure 5:
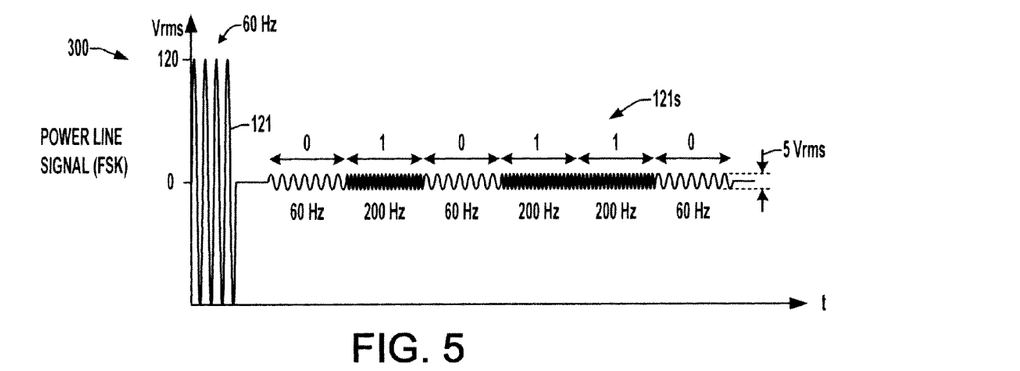
FIGS. 5-7 illustrate exemplary FSK, AM, and pulse communications signals used in the power line communications systems of FIGS. 1 and 2.
Figure 6:
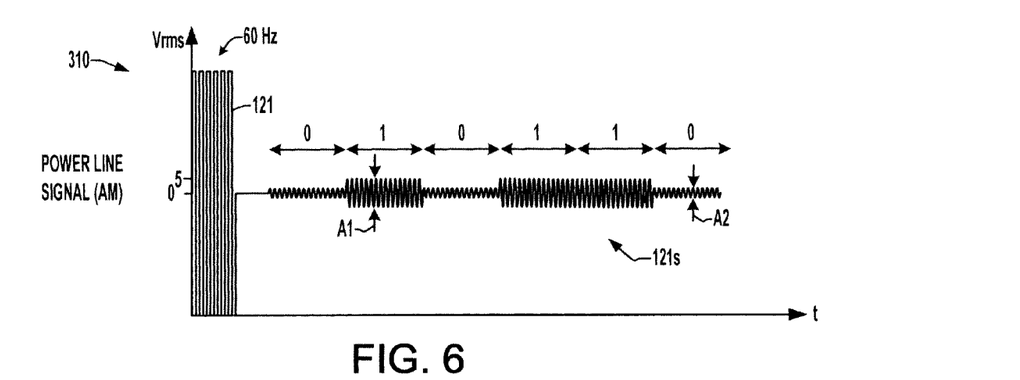
Figure 7:
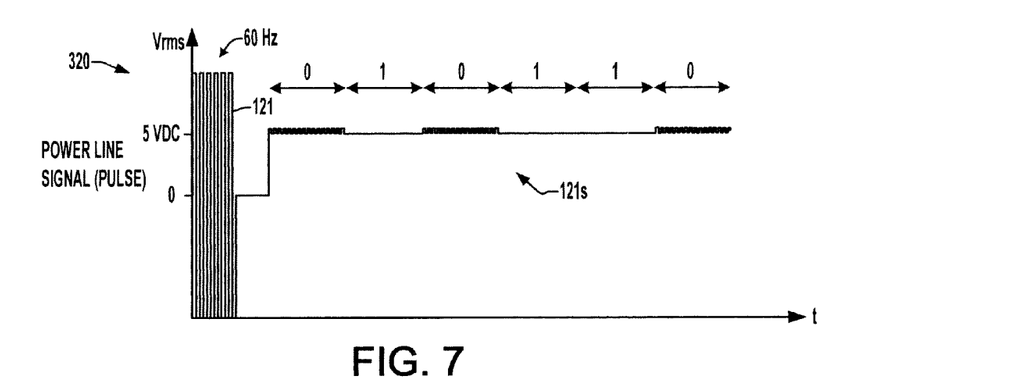

Referring also to FIGS. 5-7, the apparatus 110 may employ a variety of communications signal forms 121s, and may provide the secondary power to the connections 121a, 121b in different forms.

Graph 300 in FIG. 5 illustrates exemplary communications signaling 121s between the apparatus 110 of FIG. 1 and the transceiver 128b of FIG. 2 in which the transceiver circuit 116c (or the transceiver 128h) selectively provides the communication signal 121s as a frequency shill keyed (FSK) signal. In certain embodiments, the FSK communication signal 121s is generated using frequencies less than 500 Hz. For example, as shown in FIG. 5, two communications states can be implemented using sinusoids or other AC waveforms of 60 Hz and 200 Hz corresponding respectively to different binary states (e.g., "0" and "1"). In this example, moreover, the signal 121s is a zero DC signal with the AC communications being low amplitude (e.g., 5 Vrms) to avoid exceeding the turn on threshold 125b of the DC to DC converter 126.

FIG. 6 depicts a graph 310 showing another communication signaling embodiment in which the transceiver circuit 116c selectively provides the communication signal 121s as an amplitude modulated (AM) signal. In certain embodiments, a sinusoidal carrier is used as shown, but other carrier waveforms are possible. In this embodiment, the signal 121s is generated using low frequencies below about 500 Hz, which may but need not be the same as the line frequency of the AC power source 104. In the AM example, two communications states can be implemented using sinusoids or other AC waveforms of first and second amplitudes A1 and A2 respectively corresponding to "0" and "1" binary states. As with the embodiment of FIG. 5, the AM example of FIG. 6 uses a zero DC signal with the AM communications being low amplitude (e.g., 5 Vrms).

FIG. 7 shows a graph 320 of another exemplary embodiment using non-zero DC secondary power (e.g., 5 VDc in this case) with a communication signal 121s superimposed as a pulse signal on the DC signal. The presence or absence of the pulse in this example indicates two distinct binary states ("0" and "1" in this case). In this example, moreover, the transceiver circuit 116c selectively provides the pulse signal 121s at a frequency less than 500 Hz, and the pulses may be square or any other suitable wave shape.

As seen above, a method is disclosed for communicating with a ballast or driver 120 through power connections 121 in a lighting system 100, including selectively coupling an AC power source 104 through the power connections 121 (e.g., using switch 111 in FIG. 1) to one or more lighting ballasts or drivers 120 for powering light sources 130 in a first mode (e.g., MODE 1). In a second mode (MODE 2), the AC power source 104 is decoupled from one or more of the power connections (e.g., switch 111 disconnects the source line terminal 104a from the power line connection 121a) and secondary power is and a communication signal are provided through the power connection 121a to the ballast/drivers 120 from the communications system 116 of FIG. 1, where the secondary power and the communication signal are provided at a level below a light output turn on threshold (threshold 125b) of the ballast or driver 120.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. Obviously, modifications and alterations will occur to others upon reading and understanding the preceding detailed description. It is intended that the invention be construed as including all such modifications and alterations.

The following is claimed:

1. An apparatus for communicating with a ballast or driver through power connections in a lighting system, comprising:
   a first terminal coupled with a first output of an AC power source;
   a second terminal coupled with a first power connection, the first power connection being coupled with at least one lighting ballast or driver;
   a third terminal coupled with a second output of the AC power source;
   a first switching device coupled between the first terminal and the second terminal, the first switching device operable according to a first switching control signal to selectively couple the first terminal to the second terminal in a first state and to decouple the first terminal from the second terminal in a second state;
   a communications system coupled with the first terminal and the third terminal, the communications system comprising a secondary power output operatively coupled with the second terminal, a secondary power circuit operative to convert power from the first and third terminals to selectively provide secondary power to the secondary power output, and a transceiver circuit operative to selectively provide a communication signal to the secondary power output; and
   a control circuit operative in a first mode to provide the first switching control signal to place the first switching device in the first state to provide power from the AC power source through the first switching device to the at least one lighting ballast or driver, the control circuit being operative in a second mode to provide the first switching control signal to place the first switching device in the second state and to cause the communications system to provide the secondary power and the communication signal through the second terminal to the at least one lighting ballast or driver.

2. The apparatus of claim 1, comprising:
   a second switching device coupled between the secondary power output and the second terminal, the second switching device operable according to a second switching control signal to selectively decouple the secondary power output from the second terminal in a first state and to couple the secondary power output to the second terminal in a second state;
   where the control circuit is operative in the first mode to provide the first and second switching control signals to place the first and second switching devices in their respective first states to provide power from the AC power source through the first switching device to at least one lighting ballast or driver and in the second mode to provide the first and second switching control signals to place the first and second switching devices in their respective second states to provide the secondary power and the communication signal through the second terminal to the at least one lighting ballast or driver.

3. The apparatus of claim 2, where the transceiver circuit is operative to receive communication signals from at least one lighting ballast or driver through the second terminal.

4. The apparatus of claim 1, where the transceiver circuit is operative to selectively provide the communication signal as a frequency shift keyed (FSK) signal.

5. The apparatus of claim 4, where the transceiver circuit is operative to selectively provide the communication signal using frequencies less than 500 Hz.

6. The apparatus of claim 1, where the transceiver circuit is operative to selectively provide the communication signal as an amplitude modulated (AM) signal.

7. The apparatus of claim 6, where the transceiver circuit is operative to selectively provide the communication signal using a carrier frequency less than 500 Hz.

8. The apparatus of claim 1, where the secondary power circuit is operative to selectively provide the secondary power as a DC signal and the transceiver circuit is operative to selectively provide the communication signal as a pulse signal on the DC signal.

9. The apparatus of claim 8, where the transceiver circuit is operative to selectively provide the pulse signal at a frequency less than 500 Hz.

10. The apparatus of claim 1, further comprising a communications interface operatively coupled with the control circuit to provide communications between the control circuit and an external device.

11. The apparatus of claim 10, where the communications interface is operative to provide wireless communications between the control circuit and the external device.

12. The apparatus of claim 1, further comprising a fourth terminal operatively coupled with a control input of the control circuit.

13. The apparatus of claim 1, where the communications system is operative to selectively provide the secondary power and the communication signal to the at least one lighting ballast or driver through the second terminal at a level below a light output turn on threshold of the at least one lighting ballast or driver.

14. The apparatus of claim 1, wherein the controller is operative in the second mode to provide the first switching control signal to place the first switching device in the second state to decouple the first terminal from the second terminal for a time longer than one AC power cycle of the AC power source.

15. A method for communicating with a ballast or driver through power connections in a lighting system, the method comprising:
   in a first mode, selectively coupling an AC power source through a plurality of lighting system power connections to at least one lighting ballast or driver for powering at least one light source; and
   in a second mode:

selectively decoupling the AC power source from at least one of the lighting system power connections, providing secondary power through the at least one lighting system power connection to the at least one lighting ballast or driver, and providing a communication signal through the at least one lighting system power connection to the at least one lighting ballast or driver.

16. The method of claim 15, where the communication signal is provided as a frequency shift keyed (FSK) signal.

17. The method of claim 15, where the communication signal is provided as an amplitude modulated (AM) signal.

18. The method of claim 15, where the secondary power is provided as a DC signal and the communication signal is provided as a pulse signal on the DC signal.

19. The method of claim 15, where the secondary power and the communication signal are provided to the at least one lighting ballast or driver in the second mode at a level below a light output turn on threshold of the at least one lighting ballast or driver.

20. The method of claim 15, wherein the AC power source is decoupled from the at least one lighting system power connection and the secondary power is provided through the at least one lighting system power connection terminal in the second mode for a time longer than one AC power cycle of the AC power source.

21. A lighting system ballast or driver apparatus, comprising:

a main power conversion system operatively coupled with a plurality of lighting system power connections, the main power conversion system comprising:

at least one power conversion component operative to selectively convert power received from the lighting system power connections to provide power to at least one light source if the power received from the lighting system power connections is above a light output turn on threshold value and to otherwise refrain from providing power to the at least one light source, and a ballast or driver controller operative to control operation of the at least one power conversion component; and a communications system operatively coupled with the main power conversion system and with at least one of the lighting system power connections, the communications system comprising:

a communications power system operative to convert power from at least one of the lighting system power connections and the main power conversion system when the power received from the lighting system power connections is not above the light output turn on threshold value to provide communications power at a communications power output, a transceiver circuit operatively coupled to receive communications power from the communications power output, the transceiver circuit being operatively coupled to receive a communications signal directly or indirectly from at least one of the lighting system power connections and to provide data at a data output based at least partially on the communications signal, and a communication controller operatively coupled to receive communications power from the communications power output, the communication controller being operative to receive the data from the data output and to communicate with the ballast or driver controller.

22. The lighting system ballast or driver apparatus of claim 21, where the transceiver circuit is operative to transmit communication signals directly or indirectly to the at least one of the lighting system power connections.

23. The lighting system ballast or driver apparatus of claim 21, where the apparatus is a lighting system ballast, and where the main power conversion system comprises an inverter operative to provide AC power to at least one lamp if the power received from the lighting system power connections is above the light output turn on threshold value.

24. The lighting system ballast or driver apparatus of claim 21, where the apparatus is a lighting system driver, and where the main power conversion system comprises a DC to DC converter operative to provide DC power to at least one LED array if the power received from the lighting system power connections is above the light output turn on threshold value.

* * * * *